United States Patent [19]

Ybema et al.

[11] Patent Number: 4,857,338

[45] Date of Patent: Aug. 15, 1989

[54] METHOD OF PROMOTING THE HEALTH AND THE GROWTH OF PIGLETS

[75] Inventors: Jan Ybema, Borculo; Gerhard Schutte, Holten both of Netherlands

[73] Assignee: Coop Weiproduktenfabriek "Borculo" W.A., Borculo, Netherlands

[21] Appl. No.: 126,158

[22] Filed: Nov. 30, 1987

[51] Int. Cl.$^4$ .............................................. A23K 1/00
[52] U.S. Cl. .......................................... 426/2; 426/74; 426/335; 426/532; 426/601; 426/583; 426/807
[58] Field of Search .................. 426/335, 532, 2, 74, 426/623, 630, 807, 583, 658, 601

[56] References Cited

U.S. PATENT DOCUMENTS

| 3,898,328 | 8/1975 | Beigler et al. | 424/128 |
| 3,950,546 | 4/1976 | Hill et al. | 426/74 X |
| 4,081,555 | 3/1978 | Sawhill | 426/583 |

FOREIGN PATENT DOCUMENTS

| 7900386 | 7/1980 | Netherlands | 426/807 |

OTHER PUBLICATIONS

Morrison "Feeds and Feeding" The Morrison Publishing Co. Ithaca, N.Y. (1957) pp. 858–859 and 1124–1125.

*Primary Examiner*—R. B. Penland
*Attorney, Agent, or Firm*—Morgan & Finnegan

[57] ABSTRACT

The present invention relates to a method of promoting the growth of piglets. The method is characterized by administering a dry mixture—possibly as part of the grubbing layer in the pigsty—comprising:
1–4 parts of moisture
1–25 parts of fat
  18–28 parts of protein
13–20 parts of minerals
3–5 parts of citrate
3–5 parts of calcium formate
30–50 parts of lactose.

The invention also relates to a method of preparing a suitable mixture comprising compost, earth or the like, and 10–60% of the above dry mixture. Finally, the invention concerns a method of preparing a suitable piglet fodder which, in addition to the conventional components of piglet fodder, contains 5–25% of the above dry mixture.

5 Claims, No Drawings

METHOD OF PROMOTING THE HEALTH AND THE GROWTH OF PIGLETS

This invention relates to a method of promoting the health and the growth of piglets.

In pig farming, mortality among very young pigs due to microbial infections, in particular coli infections, is often a serious problem. During the first 4 to 6 days after birth, the piglets are fed exclusively by suckling. At that age, they do not take any food, liquid or solid, other than sow's milk. The natural defence system of the piglets against microbial infections in these first days has not fully developed yet, so that they are highly sensitive to such infections.

A symptom of such infections is usually violent diarrhoea. The piglets dehydrate and weaken. The risk of death is consequently very high. When the piglets do not die of diarrhoea, they nevertheless sustain at least a retarded growth. Due to both the mortality and the retarded growth, the stockman sustains appreciable losses. The occurrence of violent diarrhoea during the first few days of life of the piglets is usually diagnosed by the stockman as a coli infection. For combating this infection, the piglets are mostly injected daily with medicines. As a rule, in pigsties wherein coli diarrhoea has been detected, not only the affected piglets but also the still healthy piglets are injected preventively with these medicines. It is clear that this method is highly labour-intensive and expensive in the case of somewhat larger numbers of piglets. Moreover, this method tends to cause stress in the animals.

After the nursing period of at least 4-6 days after birth, the piglets change over to dry fodder. An important requirement in rearing piglets is that, in addition to preventing the above problems, optimum results are achieved at minimum cost. This means aiming for as short a rearing period as possible, while yet, achieving the required minimum delivery weight.

It has now been found that the above described problems can be solved and the object of growth promotion can be realized by administering to piglets a dry mixture consisting of:

1 to 4 parts of moisture
3 to 5 parts of calcium formate
1 to 25 parts of fat
18 to 28 parts of protein
13 to 20 parts of minerals
3 to 5 parts of citrate
30 to 50 parts of lactose.

It is observed that such a mixture, as well as a method of preparing the same, are already known in principle from Dutch patent application No. 7900386. The compositions described therein, however, are employed exclusively for the preparation of artificial calf milk having an improved microbiological and physical stability.

As explained above, piglets at such a young age do not, of their own accord, take any other fodder than the milk supplied by the sow. When administering the dry mixture, use is therefore made of their instinctive tendency to grub in the earth, which the piglets already exhibit immediately after birth. The dry mixture is mixed for the purpose with a suitable carrier, such as earth or compost. According to a preferred embodiment, there is added 10 to 60% dry mixture, calculated on the total mass, to the mass present, consisting of earth or compost. Out of curiosity, the piglets start grubbing in the grubbing layer, thereby eating the dry mixture not with intent but by way of play. When the piglets have reached the age of 4 to 6 days, the period starts wherein they receive supplementary dry fodder.

According to another preferred embodiment of the present invention, a dry fodder is prepared which, in addition to the conventional components of piglet fodder, contains 5-25% of the dry mixture.

It has now been found that with farrows of piglets having received the dry mixture, diarrhoea occurred to a far lesser extent than with farrows not having received the dry mixture. Premature mortality due to diarrhoea is thereby practically banished, too. As the piglets are healthier, they exhibit a normal growth development.

As an additional advantage of the above described method can be mentioned the positive effect on the mental well-being of the animals. The grubbing provides distraction, thereby reducing stress. As a result, the animals inflict fewer injuries on each other, resulting in turn in a better physical condition.

It is clear that the above described method of combating diarrhoea offers substantial advantages as compared to the hitherto known method. The method is not labour-intensive at all and is inexpensive.

Moreover, the administration of piglet fodder containing the dry mixture according to the present invention has been found to result in a quicker growth of the piglets during the entire rearing period.

The effect of the method according to the present invention will now be illustrated in and by the following tables.

Test 1
Piglet mortality in % of piglets born alive until delivery

|  | Conventional piglet fodder | Piglet fodder according to the present invention |
| --- | --- | --- |
| Farm A | 26 | 10 |
| Farm B | 20 | 13 |
| Farm C | 21 | 12 |
| Farm D | 18 | 12 |
| Farm E | 15 | 7 |
| Farm F | 13 | 7 |

Test 2
Comparison of piglet fodder according to the present invention with known piglet fodder Group 1: fodder (conventional composition)
Group 2: fodder according to the present invention (fodder of conventional composition containing dry mixture as earlier described).

| Group | 1 | 2 |
| --- | --- | --- |
| Number of piglets | 40 | 42 |
| Age in days | 71.0 | 68.6 |
| Delivery weight piglets in kg | 22.2 | 24.8 |
| Growth in grams per day as from birth | 291 | 340 |
| Fodder conversion | 1.18 | 0.94 |
| Fed (kg) (old composition) | 24.5 | |
| Fed (kg) (fodder according to the present invention) | | 22.0 |

RESULTS

The fodder according to the present invention gave a better growth per day, resulting in a shortened rearing period and a lower fodder consumption. The invention is illustrated in and by the following examples.

EXAMPLE 1

All contents mentioned in this example are expressed in percent by weight (% by weight).

Sweet cheese whey was concentrated in a multi-stage vacuum downdraught evaporator to a dry matter content of 58%. The resulting liquid was crystallized by slow cooling to 13° C. The lactose crystals formed were removed by centrifugation The dry matter of the remaining mother liquor contained 25% protein, 16% minerals, 4% citrate and 55% lactose. This mother liquor was concentrated in a vacuum downdraught evaporator at 55° C. to a dry matter content of 40%. To 10,000 kg of this concentrate was added 450 kg refined beef fat at 60° C. The beef fat contained 0.5% antioxidant and 1% emulsifier (glycerol monostearate).

The mixture was subsequently homogenized at a pressure of 100 bars, after which 250 l hydrochloric acid (30%) was added to the homogenate under intensive stirring. This acid liquid was dried in a spray-drying tower by means of hot air. During the pneumatic discharge of the dry powder, powdered calcium formate was dosed into the powder flow in a ratio of 1:25.

There was thus obtained a powder having the following composition:
3.0% moisture
9.3% fat
20.6% protein
14.9% minerals
3.3% citrate
3.7% calcium formate
45.2% lactose.

10 kg of the dry powder thus prepared was mixed with 90 kg of a dry piglet fodder consisting of 35 kg barley, 34.1 kg cooked maize, 10 kg skim-milk powder, 4.5 kg potato protein, 4 kg fish meal, 2.4 kg of a conventional mixture of minerals, vitamins and amino acids.

EXAMPLE 2

25 kg of the dry powder as described in Example 1 was mixed with 75 kg compost, marketed by TRIO BV under the trade name of TRIO-BEBI. The resulting mixture was put on the floor of pigsties.

What we claim:

1. A method of promoting the growth, the health, or both, of piglets comprising feeding said piglets a dry feed containing a dry composition consisting essentially of whey protein solids in an amount of 18–28 parts solids, calcium formate in an amount 3–5 parts and hydrochloric acid in an amount sufficient to give a pH below 4 in a 10% aqueous solution whereby growth rate is increased and mortality is decreased.

2. A method according to claim 1 wherein the feed composition contains a fat in the amount of 1–25 parts of fat.

3. A method according to claim 1 wherein the whey solids components are partially delactosed whey solids.

4. A method according to claim 1 wherein the dry composition contains the following:
   1–4 parts of moisture,
   1–25 parts of fat,
   18–28 parts of whey protein,
   13–20 parts of minerals,
   3–5 parts of citrate,
   3–5 parts of calcium formate, and
   30–50 parts of lactose.

5. A method according to claims 1, 2, 3 or 4 wherein 5–25% of the dry feed consists of the dry composition.

* * * * *